US012280371B2

(12) United States Patent
Cui et al.

(10) Patent No.: US 12,280,371 B2
(45) Date of Patent: Apr. 22, 2025

(54) DETECTION CHIP AND DETECTION SYSTEM

(71) Applicants: BEIJING BOE HEALTH TECHNOLOGY CO., LTD., Beijing (CN); BOE TECHNOLOGY GROUP CO., LTD., Beijing (CN)

(72) Inventors: Haochen Cui, Beijing (CN); Jing Li, Beijing (CN); Tao Hu, Beijing (CN); Lijiao Hu, Beijing (CN); Chungen Yuan, Beijing (CN); Xiaohe Shen, Beijing (CN)

(73) Assignees: BEIJING BOE HEALTH TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 710 days.

(21) Appl. No.: 17/609,816

(22) PCT Filed: Jan. 15, 2021

(86) PCT No.: PCT/CN2021/071966
§ 371 (c)(1),
(2) Date: Nov. 9, 2021

(87) PCT Pub. No.: WO2021/159914
PCT Pub. Date: Aug. 19, 2021

(65) Prior Publication Data

US 2022/0226818 A1 Jul. 21, 2022

(30) Foreign Application Priority Data

Feb. 11, 2020 (CN) ......................... 202010086487.5

(51) Int. Cl.
*B01L 3/00* (2006.01)

(52) U.S. Cl.
CPC . *B01L 3/502715* (2013.01); *B01L 2200/0689* (2013.01); *B01L 2200/12* (2013.01);
(Continued)

(58) Field of Classification Search
CPC ........... B01L 3/502715; B01L 3/50273; B01L 3/5027; B01L 2200/0689; B01L 2200/12;
(Continued)

(56) References Cited

U.S. PATENT DOCUMENTS 8,342,007 B2 1/2013 Cheng et al.
2005/0040035 A1 2/2005 Mpholo et al.
(Continued)

FOREIGN PATENT DOCUMENTS

CN 1605861 A 4/2005
CN 101059526 A 10/2007
(Continued)

OTHER PUBLICATIONS

First office action issued in Chinese Patent Application No. 202010086487.5 with search report.
(Continued)

*Primary Examiner* — Samuel P Siefke
*Assistant Examiner* — Alea N. Martin
(74) *Attorney, Agent, or Firm* — Chiwin Law LLC

(57) ABSTRACT

A detection chip and a detection system are provided. The detection chip includes a base substrate, a flow channel defining layer, and at least one driving electrode group. The at least one driving electrode group is on the base substrate, and the flow channel defining layer is on a side of the at least one driving electrode group away from the base substrate, the flow channel defining layer includes a flow channel structure, and the flow channel structure is configured to accommodate liquid; and each of the at least one driving electrode group includes a plurality of driving electrodes,
(Continued)

and the plurality of driving electrodes are configured to contact the liquid and drive the liquid to move within the flow channel structure.

17 Claims, 4 Drawing Sheets

(52) U.S. Cl.
CPC ... *B01L 2200/16* (2013.01); *B01L 2300/0645* (2013.01); *B01L 2300/0819* (2013.01); *B01L 2300/0867* (2013.01); *B01L 2300/087* (2013.01)

(58) Field of Classification Search
CPC ............ B01L 2200/16; B01L 2200/10; B01L 2300/0645; B01L 2300/0816; B01L 2300/0867; B01L 2300/087; B01L 2400/0415; G01N 27/26
See application file for complete search history.

(56) References Cited

U.S. PATENT DOCUMENTS

| | | | | |
|---|---|---|---|---|
| 2008/0000772 | A1* | 1/2008 | Bazant | G01N 27/26 204/450 |
| 2009/0029115 | A1* | 1/2009 | Goto | B32B 38/06 428/188 |
| 2011/0104025 | A1* | 5/2011 | Fouillet | B82Y 30/00 264/449 |
| 2013/0146459 | A1* | 6/2013 | Bazant | B01L 3/502784 204/601 |
| 2016/0299138 | A1* | 10/2016 | Almasri | G01N 27/02 |
| 2019/0291108 | A1 | 9/2019 | Chang et al. | |
| 2021/0322973 | A1 | 10/2021 | Chi et al. | |

FOREIGN PATENT DOCUMENTS

| | | | |
|---|---|---|---|
| CN | 101788515 | A | 7/2010 |
| CN | 102698822 | A | 10/2012 |
| CN | 102788780 | A | 11/2012 |
| CN | 102834964 | A | 12/2012 |
| CN | 104668003 | A | 6/2015 |
| CN | 107570245 | A | 1/2018 |
| CN | 109078661 | A | 12/2018 |
| CN | 109847817 | A | 6/2019 |
| CN | 110646609 | A | 1/2020 |
| CN | 111167531 | A | 5/2020 |

OTHER PUBLICATIONS

Second office action issued in Chinese Patent Application No. 202010086487.5 with search report.

* cited by examiner

DETECTION CHIP AND DETECTION SYSTEM

This application is a U.S. National Phase Entry of International Application No. PCT/CN2021/071966 filed on Jan. 15, 2021, designating the United States of America and claiming priority to Chinese Patent Application No. 202010086487.5, filed on Feb. 11, 2020. The present application claims priority to and the benefit of the above-identified applications and the above-identified applications are incorporated by reference herein in their entirety.

TECHNICAL FIELD

Embodiments of the present disclosure relate to a detection chip and a detection system.

BACKGROUND

Microfluidic chip technology integrates basic operation units such as sample reaction and detection involved in the fields of biology, chemistry, medicine, or the like into a chip with a micrometer-scale micro channel to automatically complete the whole process of reaction, detection, analysis, etc. The chip used in this process is referred to as a microfluidic chip, and may also be referred to as a lab-on-a-chip. Microfluidic chip technology has the advantages of small sample consumption, fast analysis speed, easy to be made into portable instruments, suitable for instant and on-site analysis, or the like, and has been widely used in various fields such as biology, chemistry, and medicine.

SUMMARY

At least one embodiment of the present disclosure provides a detection chip, and the detection chip includes a base substrate, a flow channel defining layer, and at least one driving electrode group; the at least one driving electrode group is on the base substrate, and the flow channel defining layer is on a side of the at least one driving electrode group away from the base substrate; the flow channel defining layer comprises a flow channel structure, and the flow channel structure is configured to accommodate liquid; and each of the at least one driving electrode group comprises a plurality of driving electrodes, and the plurality of driving electrodes are configured to contact the liquid and drive the liquid to move within the flow channel structure.

For example, in the detection chip provided by at least one embodiment of the present disclosure, the plurality of driving electrodes in the each of the at least one driving electrode group comprise a first electrode and a second electrode, and the first electrode and the second electrode form an interdigital electrode structure to transmit an alternating current signal.

For example, in the detection chip provided by at least one embodiment of the present disclosure, the first electrode comprises a plurality of first comb-shaped teeth, the second electrode comprises a plurality of second comb-shaped teeth, and the plurality of first comb-shaped teeth are alternately arranged with the plurality of second comb-shaped teeth in an extending direction of the flow channel structure.

For example, in the detection chip provided by at least one embodiment of the present disclosure, in the extending direction of the flow channel structure, a width of a first comb-shaped tooth is different from a width of a second comb-shaped tooth, so as to allow the first electrode and the second electrode to form an asymmetric interdigital electrode structure.

For example, in the detection chip provided by at least one embodiment of the present disclosure, in the extending direction of the flow channel structure, the width of the first comb-shaped tooth is smaller than the width of the second comb-shaped tooth, and a distance between adjacent first comb-shaped teeth is greater than a distance between adjacent second comb-shaped teeth.

For example, in the detection chip provided by at least one embodiment of the present disclosure, in the extending direction of the flow channel structure, the width of the first comb-shaped tooth is 2 μm to 20 μm, and the width of the second comb-shaped tooth is 10 μm to 100 μm.

For example, in the detection chip provided by at least one embodiment of the present disclosure, a material of the first electrode and a material of the second electrode comprise an inert metal material.

For example, in the detection chip provided by at least one embodiment of the present disclosure, an orthographic projection of the flow channel structure on the base substrate is within an orthographic projection of the plurality of driving electrodes on the base substrate in a first direction, and the first direction is perpendicular to an extending direction of the flow channel structure.

For example, the detection chip provided by at least one embodiment of the present disclosure further includes a mixing region, a buffer region, and a detection region, which are arranged in sequence, the flow channel defining layer is at least in the mixing region, the buffer region, and the detection region, and the at least one driving electrode group is configured to drive the liquid to sequentially pass through the mixing region, the buffer region, and the detection region.

For example, in the detection chip provided by at least one embodiment of the present disclosure, the at least one driving electrode group comprises a first driving electrode group, a second driving electrode group, and a third driving electrode group; the first driving electrode group is in the mixing region, and a plurality of driving electrodes of the first driving electrode group are configured to drive the liquid to move in the mixing region; the second driving electrode group is in the buffer region, and a plurality of driving electrodes of the second driving electrode group are configured to drive the liquid to move in the buffer region; and the third driving electrode group is in the detection region, and a plurality of driving electrodes of the third driving electrode group are configured to drive the liquid to move in the detection region.

For example, in the detection chip provided by at least one embodiment of the present disclosure, the flow channel structure comprises a first flow channel portion, a second flow channel portion, and a third flow channel portion which are sequentially connected; the first flow channel portion is in the mixing region and is configured to allow the liquid to be mixed with a reaction reagent in the first flow channel portion; the second flow channel portion is in the buffer region; and the third flow channel portion is in the detection region and is configured to allow to perform optical detection on the liquid at at least one detection point in the third flow channel portion.

For example, in the detection chip provided by at least one embodiment of the present disclosure, a cross-sectional shape of the first flow channel portion on a plane parallel to the base substrate is a rhombus.

For example, the detection chip provided by at least one embodiment of the present disclosure further includes a detection reagent, and the detection reagent is provided at the at least one detection point.

For example, in the detection chip provided by at least one embodiment of the present disclosure, the flow channel defining layer further comprises a sample inlet, and the sample inlet is outside the mixing region, the buffer region, and the detection region, and is connected to the first flow channel portion in the mixing region.

For example, in the detection chip provided by at least one embodiment of the present disclosure, the flow channel defining layer further comprises a liquid storage portion, and the liquid storage portion is outside the mixing region, the buffer region, and the detection region and is connected to the third flow channel portion in the detection region.

For example, in the detection chip provided by at least one embodiment of the present disclosure, the first flow channel portion, the second flow channel portion, and the third flow channel portion form a liquid movement channel, and the liquid movement channel enables the liquid to move along a movement path of a straight-line shape.

For example, the detection chip provided by at least one embodiment of the present disclosure further includes a cover plate, and the cover plate is on a side of the flow channel defining layer away from the at least one driving electrode group.

At least one embodiment of the present disclosure further provides a detection system, and the detection system includes the detection chip provided by any one of the embodiments of the present disclosure.

For example, the detection system provided by at least one embodiment of the present disclosure further includes a control device and a chip mounting structure; the chip mounting structure comprises a signal application electrode, the chip mounting structure is configured to mount the detection chip, and in a case where the detection chip is mounted on the chip mounting structure, the signal application electrode is electrically connected to the plurality of driving electrodes in the each of the at least one driving electrode group; and the control device is configured to apply an electrical signal to the plurality of driving electrodes in the each of the at least one driving electrode group through the signal application electrode, so as to drive the liquid to move and adjust a movement rate of the liquid.

For example, in the detection system provided by at least one embodiment of the present disclosure, the electrical signal comprises an alternating current signal.

For example, the detection system provided by at least one embodiment of the present disclosure further includes an optical detection device, and the optical detection device is configured to perform optical detection on the liquid at at least one detection point in a detection region of the detection chip mounted on the chip mounting structure.

BRIEF DESCRIPTION OF THE DRAWINGS

In order to clearly illustrate the technical solutions of the embodiments of the present disclosure, the drawings of the embodiments will be briefly described in the following. It is obvious that the described drawings are only related to some embodiments of the present disclosure and thus are not limitative to the present disclosure.

DETAILED DESCRIPTION

Figure 1:
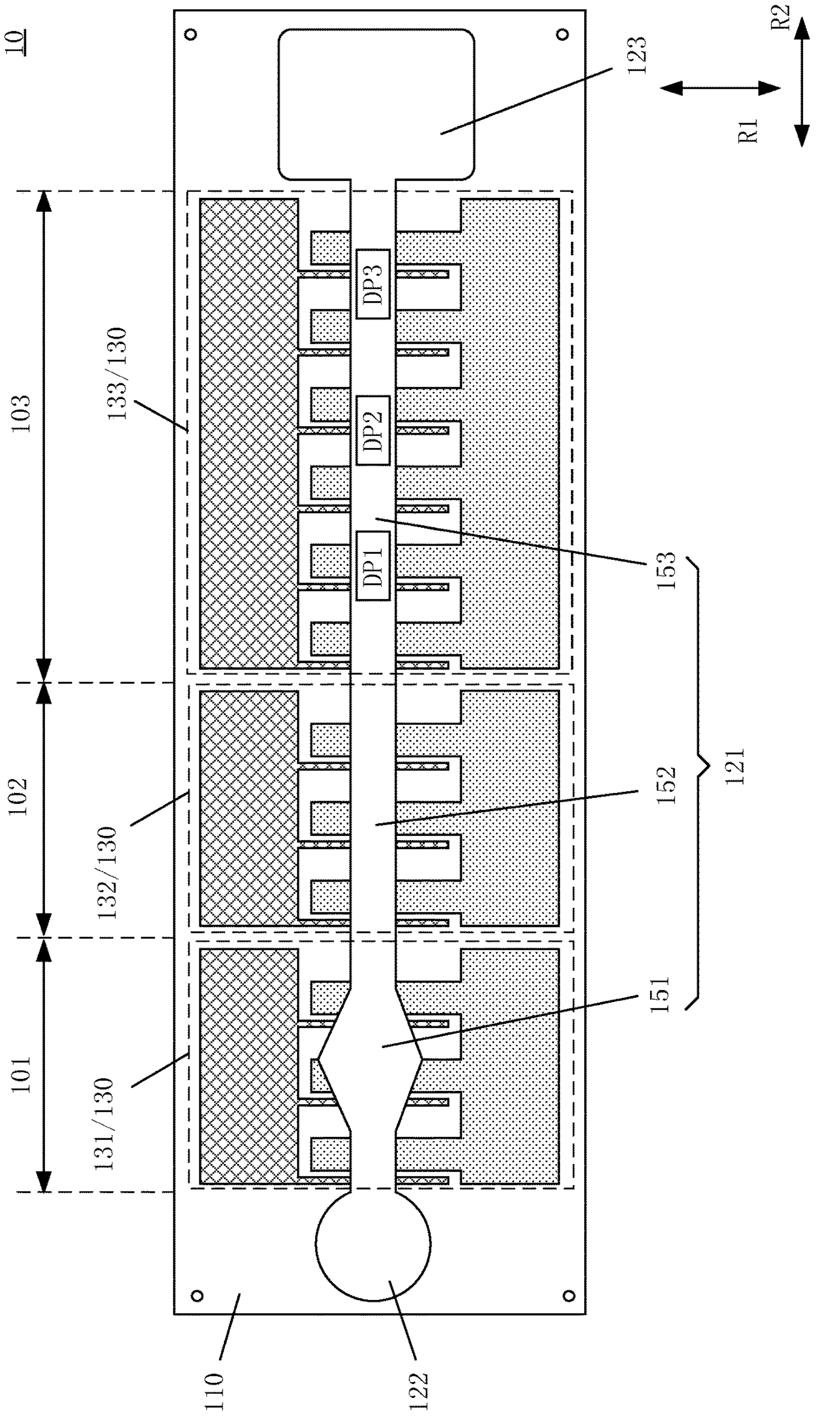
FIG. 1 is a schematic planar diagram of a detection chip provided by an embodiment of the present disclosure.

In order to make objects, technical details and advantages of the embodiments of the present disclosure apparent, the technical solutions of the embodiments of the present disclosure will be described in a clearly and fully understandable way in connection with the drawings related to the embodiments of the present disclosure. Apparently, the described embodiments are just a part but not all of the embodiments of the present disclosure. Based on the described embodiments of the present disclosure herein, those skilled in the art can obtain other embodiment(s), without any inventive work, which should be within the scope of the present disclosure.

Unless otherwise defined, all the technical and scientific terms used herein have the same meanings as commonly understood by one of ordinary skill in the art to which the present disclosure belongs. The terms “first,” “second,” etc., which are used in the description and the claims of the present application for disclosure, are not intended to indicate any sequence, amount or importance, but distinguish various components. Also, the terms such as “a,” “an,” etc., are not intended to limit the amount, but indicate the existence of at least one. The terms “comprise,” “comprising,” “include,” “including,” etc., are intended to specify that the elements or the objects stated before these terms encompass the elements or the objects and equivalents thereof listed after these terms, but do not preclude the other elements or objects. The phrases “connect,” “connected,” “coupled,” etc., are not intended to define a physical connection or mechanical connection, but may include an electrical connection, directly or indirectly. “On,” “under,” “right,” “left,” and the like are only used to indicate relative position relationship, and when the position of the object which is described is changed, the relative position relationship may be changed accordingly.

When the microfluidic chip is used to detect and analyze a sample, because the microfluidic chip is usually designed as a passive chromatography chip, the movement of the sample in the microfluidic chip usually needs to depend on the fluidity of the sample itself, and the movement process of the liquid in the microfluidic chip is difficult to be actively controlled. Moreover, the fluidity of different samples may usually be different and unstable. Therefore, when a passive chromatography microfluidic chip is used to detect a sample, because it is difficult to accurately control the movement process of the sample in the chip, for example, difficult to accurately control the fluid volume or flow rate of the sample in different regions, it is difficult to achieve the quantitative detection on the sample using the passive chromatography microfluidic chip. In this way, not only the accuracy and precision of the obtained detection result will be reduced, but also the repeatability and sensitivity of the detection process will be adversely affected, so that it is difficult for passive chromatography microfluidic chips to be widely used in different detection scenarios.

In addition, because the movement of the sample in the passive chromatography microfluidic chip needs to be achieved through the fluidity of the sample itself, when the passive chromatography microfluidic chip is used to detect and analyze a sample with a slow flow rate, the detection time required may usually be relatively long, and the possibility of sample failure is relatively great. Therefore, it is difficult to perform timely and effective detection on the sample, which may result in a decrease in the accuracy of the detection result.

At least one embodiment of the present disclosure provides a detection chip, and the detection chip includes a base substrate, a flow channel defining layer, and at least one driving electrode group. The at least one driving electrode group is located on the base substrate, and the flow channel defining layer is located on a side of the at least one driving electrode group away from the base substrate; the flow channel defining layer includes a flow channel structure, and the flow channel structure is configured to accommodate liquid; and each of the at least one driving electrode group includes a plurality of driving electrodes, and the plurality of driving electrodes are configured to contact the liquid and drive the liquid to move within the flow channel structure.

In the detection chip provided by the at least one embodiment of the present disclosure described above, the driving electrode is in contact with the liquid (that is, a sample to be detected) to drive the liquid to move within the flow channel structure, so that the flow process of the liquid in the flow channel structure can be actively controlled by the driving electrode, for example, the fluid volume or flow rate of the liquid in different regions can be accurately controlled, so as to accurately control the liquid to move regularly and quantitatively among different regions. Therefore, on the premise that the size and manufacturing cost of the detection chip are not increased, the detection chip provided by the embodiments of the present disclosure can not only significantly shorten the detection time and reduce the detection cost, but also facilitate achieving the quantitative detection on the liquid, thereby improving the accuracy and precision of the detection result obtained by using the detection chip, and improving the repeatability and sensitivity of the detection process, so that the detection chip provided by the embodiments of the present disclosure can be widely used in different detection scenarios.

Hereinafter, the embodiments of the present disclosure will be described in detail with reference to the drawings. It should be noted that the same reference numerals in different drawings are used to refer to the same described elements.

Figure 2:
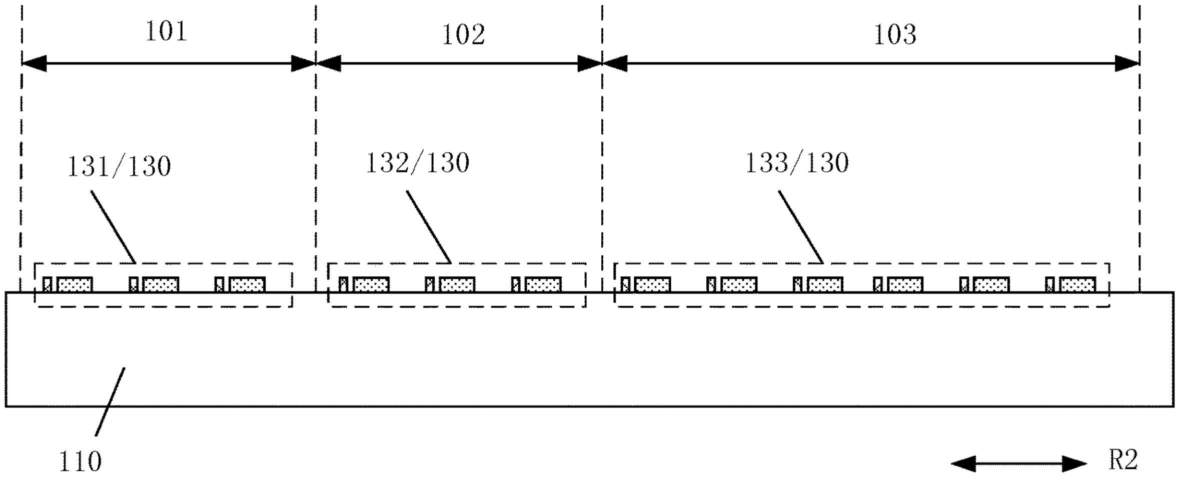
FIG. 2 is a schematic diagram of a partial cross-sectional structure of a detection chip provided by an embodiment of the present disclosure.

FIG. 1 is a schematic planar diagram of a detection chip provided by an embodiment of the present disclosure, and FIG. 2 is a schematic diagram of a partial cross-sectional structure of a detection chip provided by an embodiment of the present disclosure.

For example, as illustrated in FIG. 1 and FIG. 2, the detection chip 10 includes a base substrate 110, a flow channel defining layer, and a plurality of driving electrode groups 130. The driving electrode groups 130 are located on the base substrate 110, and the flow channel defining layer is located on a side of the driving electrode groups 130 away from the base substrate 110. The flow channel defining layer includes a flow channel structure 121, and the flow channel structure 121 is configured to accommodate liquid. For example, the flow channel structure 121 is a hollow portion or a recessed portion of the flow channel defining layer. Each of the plurality of driving electrode groups 130 includes a plurality of driving electrodes, and the plurality of driving electrodes are configured to contact the liquid and drive the liquid to move within the flow channel structure 121.

For example, as illustrated in FIG. 1 and FIG. 2, the detection chip 10 further includes a mixing region 101, a buffer region 102, and a detection region 103, which are arranged in sequence. The flow channel defining layer is located at least in the mixing region 101, the buffer region 102, and the detection region 103, and the plurality of driving electrode groups 130 are configured to drive the liquid to sequentially pass through the mixing region 101, the buffer region 102, and the detection region 103.

For example, the plurality of driving electrode groups 130 includes a first driving electrode group 131, a second driving electrode group 132, and a third driving electrode group 133. The first driving electrode group 131 is located in the mixing region 101, and a plurality of driving electrodes of the first driving electrode group 131 are configured to drive the liquid to move in the mixing region 101. The second driving electrode group 132 is located in the buffer region 102, and a plurality of driving electrodes of the second driving electrode group 132 are configured to drive the liquid to move in the buffer region 102. The third driving electrode group 133 is located in the detection region 103, and a plurality of driving electrodes of the third driving electrode group 133 are configured to drive the liquid to move in the detection region 103.

Thus, the detection chip 10 can actively control the flow process of the liquid in the flow channel structure 121 through the driving electrodes in the first driving electrode group 131, the second driving electrode group 132, and the third driving electrode group 133, for example, the detection chip 10 can accurately control the fluid volume or flow rate of the liquid in the mixing region 101, the buffer region 102, and the detection region 103, respectively, so as to accurately control the liquid to move regularly and quantitatively among the mixing region 101, the buffer region 102, and the detection region 103.

It should be noted that the detection chip 10 illustrated in FIG. 1 includes the mixing region 101, the buffer region 102, and the detection region 103, while in some other embodiments of the present disclosure, the detection chip may also include more or fewer functional regions, and the functional regions of the detection chip are not limited to the above types, that is, the functional regions of the detection chip may also be divided by other different methods, and the embodiments of the present disclosure are not limited in this aspect.

It should be noted that in the detection chip 10 provided by the embodiments of the present disclosure, the first driving electrode group 131, the second driving electrode group 132, and the third driving electrode group 132 are correspondingly provided in the mixing region 101, the buffer region 102, and the detection region 103, respectively. Alternatively, in some other embodiments of the present disclosure, the driving electrode group may also be correspondingly provided in only one or two of the mixing region 101, the buffer region 102, and the detection region 103. Alternatively, in some other embodiments of the present disclosure, according to different practical requirements (for example, according to different functional regions included in the detection chip), the detection chip may also include one, two, four, or more driving electrode groups to drive the liquid to move within the flow channel structure. The embodiments of the present disclosure do not limit the specific number of driving electrode groups included in the detection chip.

For example, as illustrated in FIG. 1 and FIG. 2, the plurality of driving electrodes in each of the first driving electrode group 131, the second driving electrode group 132, and the third driving electrode group 133 include a first electrode and a second electrode, and the first electrode and the second electrode form an interdigital electrode structure to transmit an alternating current signal. For example, a surface of the first electrode and a surface of the second electrode away from the base substrate 110 are not covered by other films or layers, that is, are exposed in the flow channel structure 121. When the liquid is in the flow channel structure 121, the first electrode and the second electrode may be in direct contact with the liquid. Thus, the electro-hydrodynamic effect can be generated by the alternating electric field formed between the first electrode and the second electrode, so as to drive the liquid in contact with the first electrode and the second electrode to flow in the flow channel structure 121, so that the flow of the liquid in the flow channel structure 121 can be actively and precisely controlled, thereby facilitating the quantitative detection on the liquid.

For example, when an alternating current signal is applied to the first electrode and the second electrode in each driving electrode group, an alternating electric field is formed between the first electrode and the second electrode. Furthermore, because the first electrode and the second electrode are in direct contact with the liquid in the flow channel structure, the electro-hydrodynamic effect is generated in the liquid in the flow channel structure under the action of the first electrode and the second electrode, so that the electro-hydrodynamic effect can be used to drive the liquid to move in the flow channel structure to achieve the active control of the flow process of the liquid. The electro-hydrodynamic effect includes an alternating current electro-osmosis effect and an alternating current electro-thermal effect. The alternating current electro-osmosis effect acts on the ions and the particles, which can be polarized, in the liquid on the surface of the electrode, and drives the liquid to move through the movement of the particles. The alternating current electro-thermal effect uses the conductive liquid to generate the Joule thermal effect, which changes the electrical properties of the liquid, so that net charges are generated in the liquid under the action of a non-uniform electric field, thereby inducing the electric field force to drive the liquid to move. For example, in the detection chip 10 provided by the embodiments of the present disclosure, in the case where the conductivity of the liquid to be detected is high, the alternating current electro-thermal effect plays a leading role in driving the liquid; and in the case where the conductivity of the liquid to be detected is low, the alternating current electro-osmosis effect plays a leading role in driving the liquid.

For example, in the detection chip 10 provided by the embodiments of the present disclosure, the arrangement of the plurality of driving electrodes in the first driving electrode group 131, the arrangement of the plurality of driving electrodes in the second driving electrode group 132, and the arrangement of the plurality of driving electrodes in the third driving electrode group 133 are the same. Alternatively, in some other embodiments of the present disclosure, the arrangement of the driving electrodes in each of the plurality of driving electrode groups may also be different from each other, and the embodiments of the present disclosure are not limited in this aspect. The embodiments of the present disclosure are described by taking a case that the driving electrodes in each of the first driving electrode group 131, the second driving electrode group 132, and the third driving electrode group 133 are arranged in the same manner as an example, but this is not limitative to the embodiments of the present disclosure.

Hereinafter, the embodiments of the present disclosure take the driving electrodes in the first driving electrode group 131 as an example to describe the arrangement of the driving electrodes in the driving electrode group.

Figure 3:
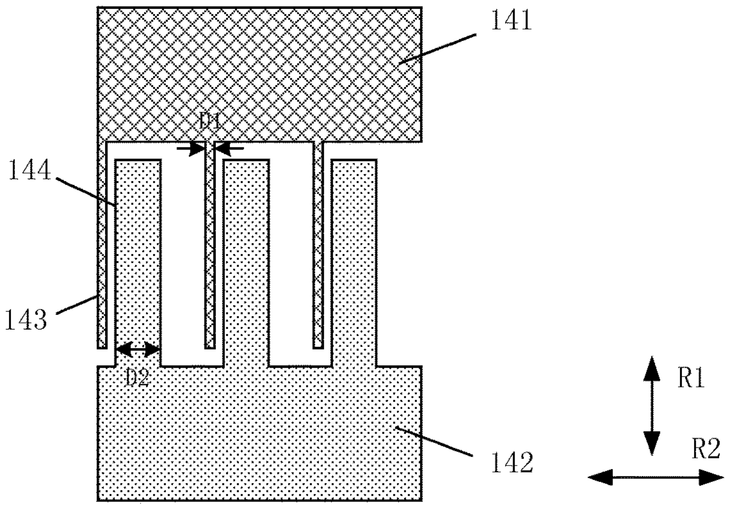
FIG. 3 is a schematic diagram of a partial planar structure of a driving electrode group of a detection chip provided by an embodiment of the present disclosure.

FIG. 3 is a schematic diagram of a partial planar structure of a driving electrode group of a detection chip provided by an embodiment of the present disclosure. For example, FIG. 3 is a schematic diagram of a planar structure of the first driving electrode group 131 of the detection chip 10 illustrated in FIG. 1.

For example, as illustrated in FIG. 1 to FIG. 3, the first driving electrode group 131 includes a first electrode 141 and a second electrode 142, and the first electrode 141 and the second electrode 142 form an interdigital electrode structure to transmit an alternating current signal. Thus, in the case where the first electrode 141 and the second electrode 142 are applied with an alternating current signal having a certain frequency and a certain amplitude, an alternating electric field is formed between the first electrode 141 and the second electrode 142, thereby generating an electro-hydrodynamic effect to drive the liquid in the flow channel structure 121 to move.

For example, the first electrode 141 includes a plurality of first comb-shaped teeth 143, and the second electrode 142 includes a plurality of second comb-shaped teeth 144. The plurality of first comb-shaped teeth 143 are alternately arranged with the plurality of second comb-shaped teeth 144 in an extending direction R2 of the flow channel structure 121, so that the alternating current signal can be transmitted between the first comb-shaped tooth 143 and the second comb-shaped tooth 144 which are adjacent.

For example, in the extending direction R2 of the flow channel structure 121, a width D1 of the first comb-shaped tooth 143 is different from a width D2 of the second comb-shaped tooth 144, so that the first electrode 141 and the second electrode 142 form an asymmetric interdigital electrode structure, thereby enhancing the effect of the alternating electric field formed between the first comb-shaped tooth 143 and the second comb-shaped tooth 144 which are adjacent, and facilitating generating the phenomenon of electro-hydrodynamic effect.

For example, in the extending direction R2 of the flow channel structure 121, the width D1 of the first comb-shaped tooth 143 is smaller than the width D2 of the second comb-shaped tooth 144, and a distance between adjacent first comb-shaped teeth 143 is greater than a distance between adjacent second comb-shaped teeth 144.

For example, in the extending direction R2 of the flow channel structure 121, the width D1 of the first comb-shaped tooth 143 may be set to be 2 μm to 20 μm, and the width D2 of the second comb-shaped tooth 144 may be set to be 10 μm to 100 μm.

For example, the width D2 of the second comb-shaped tooth 144 can be set to be about 5 times the width D1 of the first comb-shaped tooth 143, and a distance between the first comb-shaped tooth 143 and the second comb-shaped tooth 144 which are adjacent may be equal to the width D1 of the first comb-shaped tooth 143 or the width D2 of the second comb-shaped tooth 144.

For example, the materials of the first electrode 141 and the second electrode 142 include an inert metal material. For example, the materials of the first electrode 141 and the second electrode 142 may be stable metal materials such as gold, platinum, etc., so as to reduce or prevent the reaction between the liquid and the first electrode 141 as well as the second electrode 142 (for example, being corroded by the liquid), and further improve the accuracy and precision of the obtained detection result.

For example, in some other embodiments, non-inert metal materials (such as magnesium, aluminum, iron, tin, etc.) may also be used to manufacture the first electrode 141 and the second electrode 142. In this case, for example, an inert metal protective layer may be formed on the surface of the first electrode 141 and the surface of the second electrode 142 by methods such as electroplating, deposition, or the like.

For example, the height of the first electrode 141 and the height of the second electrode 142 in the direction perpendicular to the base substrate 110 may be 50 nm to 200 nm, so that it is convenient to manufacture the first electrode 141 and the second electrode 142 directly on the base substrate 110.

For example, the base substrate 110 may be made of glass, silicon, or the like, and the first electrode 141 and the second electrode 142 may be directly formed on the surface of the base substrate 110 through a semiconductor micromachining process, so that the height of the first electrode 141 and the height of the second electrode 142 can be formed substantially the same, thereby forming a flat, uniform, and stable electrode film layer.

It should be noted that the arrangement and effect of the driving electrodes in the second driving electrode group 132 and the arrangement and effect of the driving electrodes in the third driving electrode group 133 may be referred to the above-mentioned description of the first electrode 141 and the second electrode 142 in the first driving electrode group 131, and details are not described herein again.

For example, as illustrated in FIG. 1, an orthographic projection of the flow channel structure 121 on the base substrate 110 is located in an orthographic projection of the plurality of driving electrodes on the base substrate 110 in the first direction R1, and the first direction R1 is perpendicular to the extending direction R2 of the flow channel structure 121. Therefore, the liquid at any position in the flow channel structure 121 can directly contact the driving electrode, thereby further improving the driving effect of the plurality of driving electrodes on the liquid in the flow channel structure 121, and achieving the effective control of the movement of the liquid in the flow channel structure 121.

For example, taking the first driving electrode group 131 as an example, in the mixing region 101, an orthographic projection of the flow channel structure 121 on the base substrate 110 is located in an orthographic projection of the first electrode 141 and an orthographic projection of the second electrode 142 on the base substrate 110 in the first direction R1, so that the liquid at any position in the mixing region 101 can directly contact the first electrode 141 and the second electrode 142, thereby improving the driving effect of the first electrode 141 and the second electrode 142 on the liquid in the mixing region 101, and achieving the effective control of the liquid flowing through the mixing region 101.

For example, as illustrated in FIG. 1, the flow channel structure 121 includes a first flow channel portion 151, a second flow channel portion 152, and a third flow channel portion 153 which are connected in sequence. The first flow channel portion 151 is located in the mixing region 101 and is configured to allow the liquid to be mixed with a reaction reagent located in the first flow channel portion 151. The second flow channel portion 152 is located in the buffer region 102. The third flow channel portion 153 is located in the detection region 103 and is configured to allow to perform optical detection on the liquid at at least one detection point (for example, a first detection point DP1, a second detection point DP2, and a third detection point DP3) in the third flow channel portion 153.

For example, a shape of a cross section of the first flow channel portion 151 on a plane parallel to the base substrate 110 is a rhombus, so that the area of the first flow channel portion 151 can be increased to enable the liquid to be fully mixed and reacted with the reaction reagent in the first flow channel portion 151, thereby improving the accuracy and precision of the obtained detection result.

For example, the reaction reagent is pre-embedded in the first flow channel portion 151, and the reaction reagent may be a labeled antibody. For example, the liquid injected into the flow channel structure 121 may be a sample solution to be detected, and the sample solution to be detected contains emulsions, body fluids, blood, or the like of humans or animals. For example, the electrical signal applied to the driving electrodes (for example, the first electrode 141 and the second electrode 142) of the first driving electrode group 131 may be adjusted to promote the combination of the liquid and the labeled antibody, thereby increasing the combination quantity of the liquid and the labeled antibody, so that the detection of the index or item data of the liquid in the subsequent process can be more accurate and precise. For example, the electrical signal applied to the driving electrodes of the first driving electrode group 131 may further be adjusted to enable the liquid to move backwards and forwards in the first flow channel portion 151, thereby increasing the combination rate of the liquid and the labeled antibody.

For example, the side length of the rhombus shape of the first flow channel portion 151 may be set to be 1 mm to 10 mm, and the depth of the first flow channel portion 151 (that is, the height in the direction perpendicular to the base substrate 110) may be set to be 0.02 mm to 1 mm.

For example, in the mixing region 101, the two sides of the first flow channel portion 151 in the extending direction R2 of the flow channel structure 121 are respectively connected to the second flow channel portion 152 and the sample inlet 122 (described later in detail) through connection portions, and the size design of the connection portion may be the same as that of the second flow channel portion 152. For example, the width (that is, the size in the first direction R1) of the connection portion may be set to be 1 mm to 10 mm, and the length (that is, the size in the extending direction R2 of the flow channel structure 121) may be set to be 1 mm to 2 mm. For example, the first flow channel portion 151 is connected with the second flow channel portion 152 and the sample inlet 122, respectively, and the liquid can enter the first flow channel portion 151 from the sample inlet 122 and then move to the second flow channel portion 152.

It should be noted that, in the embodiments of the present disclosure, the specific size of the first flow channel portion 151 and the specific size of the corresponding connection portion may be determined according to the quantity of the sample of the liquid to be detected, and the specific size of the first flow channel portion 151 is not limited in the embodiments of the present disclosure.

It should be noted that in some other embodiments of the present disclosure, according to the actual different structures of the detection chip 10, the first flow channel portion 151 may also be set to be circular, square, elliptical, hexagonal, trapezoidal, or in other regular or irregular shapes, etc., and the embodiments of the present disclosure are not limited in this aspect.

For example, the second flow channel portion 152 can buffer the liquid before the liquid enters the third flow channel portion 153, thereby ensuring the stability of the liquid entering the third flow channel portion 153, and further improving the accuracy and precision of the detection result obtained in the subsequent process.

For example, the width (that is, the size in the first direction R1) of the second flow channel portion 152 may be set to be 1 mm to 10 mm, the length (that is, the size in the extending direction R2 of the flow channel structure 121) of the second flow channel portion 152 may be set to be 10 mm to 20 mm, and the depth of the second flow channel portion 152 may be set to be 0.02 mm to 1 mm.

It should be noted that the specific shape and size of the second flow channel portion 152 can be determined according to the actual different structures of the detection chip 10 and the quantity of the sample of the liquid to be detected, and the embodiments of the present disclosure are not limited in this aspect.

For example, the detection chip 10 further includes a detection reagent, and the detection reagent is provided at the first detection point DP1, the second detection point DP2, and the third detection point DP3 in the third flow channel portion 153. When the liquid flows through the first detection point DP1, the second detection point DP2, and the third detection point DP3, the liquid reacts with the detection reagent, and then a certain index or item data of the liquid can be obtained by performing optical detection on the first detection point DP1, the second detection point DP2, and the third detection point DP3.

For example, when performing optical detection on the first detection point DP1, the second detection point DP2, and the third detection point DP3, common detection methods in the biological detection field can be used, such as color change detection, absorbance detection, fluorescence intensity detection, chemiluminescence intensity detection, etc., and the embodiments of the present disclosure are not limited in this aspect.

For example, in the detection chip 10 provided by the embodiments of the present disclosure, different detection reagents may be pre-embedded at the first detection point DP1, the second detection point DP2, and the third detection point DP3, respectively, so that different indexes or item data of the liquid can be detected separately, thereby shortening the detection period of the liquid, and achieving the timely and simultaneous detection of multiple indexes and item data of the liquid.

For example, the detection reagent pre-embedded at the first detection point DP1, the second detection point DP2, and the third detection point DP3 may be a capture antibody. For example, the electrical signal applied to the driving electrodes of the third driving electrode group 133 can be adjusted to promote the combination of the liquid and the capture antibody, thereby increasing the combination quantity of the liquid and the capture antibody, and improving the accuracy and precision of the obtained detection result.

It should be noted that the embodiments of the present disclosure do not limit the distance between adjacent detection points and the specific size of the detection point. For example, the distance among the first detection point DP1, the second detection point DP2, and the third detection point DP3 may be set according to the requirements of the optical detection instrument that implements the optical detection. For example, the distance between adjacent detection points may be set to be 0.1 mm to 5 mm, and the embodiments of the present disclosure are not limited in this aspect.

For example, in the detection chip 10 provided by the embodiments of the present disclosure, three detection points, that is, the first detection point DP1, the second detection point DP2, and the third detection point DP3, are provided in the third flow channel portion 153. In some other embodiments of the present disclosure, the number of detection points in the third flow channel portion may also be set according to different actual needs, for example, the number of detection points in the third flow channel portion may be set according to the count of indexes or item data of the liquid to be detected, etc., and the embodiments of the present disclosure are not limited in this aspect.

For example, the width (that is, the size in the first direction R1) of the third flow channel portion 153 may be set to be 1 mm to 10 mm, the length (that is, the size in the extending direction R2 of the flow channel structure 121) of the third flow channel portion 153 may be set to be 10 mm to 40 mm, and the depth of the third flow channel portion 153 may be set to be 0.02 mm to 1 mm.

It should be noted that the specific shape and size of the third flow channel portion 153 may be determined according to the actual different structures of the detection chip 10 and the quantity of the sample of the liquid to be detected, and the embodiments of the present disclosure are not limited in this aspect.

For example, as illustrated in FIG. 1, the flow channel defining layer further includes a sample inlet 122, and the sample inlet 122 is located outside the mixing region 101, the buffer region 102, and the detection region 103 and is connected to the first flow channel portion 151 located in the mixing region 101. For example, the sample inlet 122 may be connected with the first flow channel portion 151 through a corresponding connection portion.

For example, the sample inlet 122 may be in a shape of circle as illustrated in FIG. 1, and for example, the diameter of the circle may be set to be 1 mm to 10 mm. Alternatively, in some other embodiments of the present disclosure, the sample inlet 122 may also be set to other different shapes or sizes, and the embodiments of the present disclosure are not limited in this aspect.

For example, the sample inlet 122 can be used to add the liquid to be detected. For example, the liquid in the embodiments of the present disclosure may be a sample to be detected, such as the breast milk, body fluid, blood, or the like.

For example, as illustrated in FIG. 1, the flow channel defining layer further includes a liquid storage portion 123, and the liquid storage portion 123 is located outside the mixing region 101, the buffer region 102, and the detection region 103 and is connected with the third flow channel portion 153 located in the detection region 103.

For example, the liquid storage portion 123 may be in a shape of square as illustrated in FIG. 1, and for example, the side length of the square may be set to be 5 mm to 20 mm. Alternatively, in some other embodiments of the present disclosure, the liquid storage portion 123 may also be set to other different shapes or sizes, as long as the liquid storage portion can contain sufficient waste liquid (i.e., excess liquid), and the embodiments of the present disclosure are not limited in this aspect.

For example, the first flow channel portion 151, the second flow channel portion 152, and the third flow channel portion 153 form a liquid movement channel. The liquid movement channel allows the liquid to move along a movement path of a straight-line shape, thereby facilitating the driving electrode to more accurately and precisely control the liquid to move in the flow channel structure 121.

For example, in the embodiments of the present disclosure, the material of the flow channel defining layer of the detection chip 10 may be polymer plastic, such as polymethyl methacrylate (PMMA), polystyrene (PS), polycarbonate (PC), etc., or may also be other bio-chip materials with properties such as good biocompatibility, good light transmission, high smoothness, high flatness, or the like, and the embodiments of the present disclosure are not limited in this aspect.

For example, the flow channel structure 121 may be integrally formed by an injection molding process, thereby reducing the manufacturing cost of the detection chip 10 and reducing the difference between the detection chips 10 of different batches. For example, the flow channel structure 121 may also be processed in the flow channel defining layer by etching or the like, and the embodiments of the present disclosure are not limited in this aspect.

For example, the base substrate 110 may be made of materials such as glass, silicon, or the like, and the driving electrodes may be directly formed on the surface of the base substrate 110 through a semiconductor micromachining process.

For example, the base substrate 110 and the flow channel defining layer may be bonded together through such as photosensitive adhesive (UV adhesive) curing, so as to prevent the liquid in the flow channel structure 121 from leaking out.

For example, the shape of the detection chip 10 provided by the embodiments of the present disclosure is designed to be a rectangle, and the overall size of the detection chip 10 may be, for example, about 100 mm by 30 mm. In some other embodiments of the present disclosure, the size of the detection chip may also be adjusted according to different practical detection requirements (such as the amount of liquid to be detected), and the detection chip may also be designed in other different shapes, such as a circle, a regular hexagon, and other regular shapes or irregular shapes, and the embodiments of the present disclosure are not limited in this aspect.

Figure 4:
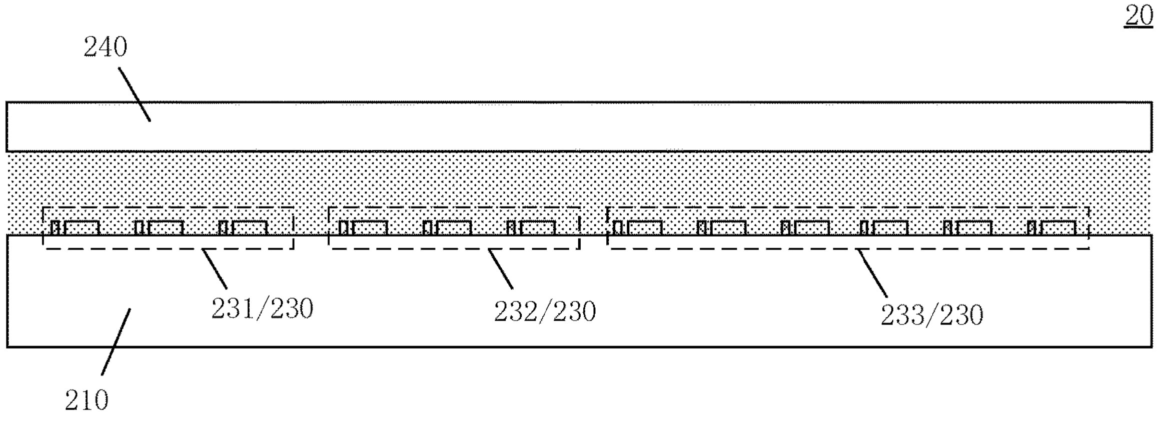
FIG. 4 is a schematic diagram of a partial cross-sectional structure of another detection chip provided by an embodiment of the present disclosure.

FIG. 4 is a schematic diagram of a partial cross-sectional structure of another detection chip provided by an embodiment of the present disclosure. It should be noted that the other structures of the detection chip 20 illustrated in FIG. 4 except for a cover plate 240 are basically the same as or similar to those of the detection chip 10 illustrated in FIG. 1, and details will not be repeated herein.

For example, the detection chip 20 further includes a cover plate 240, and the cover plate 240 is located on a side of the flow channel defining layer away from the driving electrode groups 230 (for example, including the first driving electrode group 231, the second driving electrode group 232, and the third driving electrode group 233), so that the liquid in the flow channel structure can be sealed by the cover plate 240 and the base substrate 210, thereby reducing or avoiding possible adverse effects of the external environment on the liquid in the flow channel structure, and further improving the accuracy and precision of the detection result.

For example, the cover plate 240 and the flow channel defining layer can be bonded together through such as photosensitive adhesive (UV adhesive) curing. For example, the flow channel structure is a hollow portion in the flow channel defining layer, and therefore the flow channel structure between the cover plate 240 and the base substrate 210 is formed as a closed cavity, thereby preventing liquid leakage. For example, the cover plate 240 may be made of glass, silicon, or the like, and the material of the cover plate 240 may be the same as or different from that of the base substrate 110.

Hereinafter, taking the detection chip 10 illustrated in FIG. 1 as an example, a method for driving, through the driving electrode, the liquid in the flow channel structure 121 to move will be described.

For example, the liquid to be detected, after being filtered, enters the flow channel structure 121 through the sample inlet 122. After the liquid is injected through the sample inlet 122, the driving electrodes (for example, the first electrode 141 and the second electrode 142) of the first driving electrode group 131 are applied with electrical signals, so that an alternating electric field is formed between the driving electrodes of the first driving electrode group 131 to transmit the alternating current signal, and thus the generated electro-hydrodynamic effect is used to drive the liquid to move in the first flow channel portion 151, that is, to promote the liquid to move in the mixing region 101.

For example, after the liquid enters the mixing region 101, the magnitude of the electrical signal applied to the driving electrodes of the first driving electrode group 131 may be adjusted to promote the mixing and reaction of the liquid with the reaction reagent in the first flow channel portion 151, thereby enabling the liquid to be fully combined with the reaction reagent and improving the accuracy and precision of the index or item data of the liquid detected in the subsequent process.

For example, the range of the amplitude of the electrical signal applied to the driving electrodes of the first driving electrode group 131 may be 1 V to 10 V, and the frequency may be 1 Hz to 100 kHz. It should be noted that the specific values of the amplitude and frequency of the applied electrical signal may be determined according to the properties of the liquid and the material of the driving electrodes, and the embodiments of the present disclosure are not limited in this aspect.

For example, after the liquid stays in the mixing region 101 for a period of time and is fully combined with the reaction reagent in the first flow channel portion 151, the driving electrodes of the second driving electrode group 132 are applied with electrical signals, so that an alternating electric field is formed between the driving electrodes of the second driving electrode group 132 to transmit the alternating current signal, and thus the generated electro-hydrodynamic effect is used to drive the liquid to move in the second flow channel portion 152, that is, to promote the liquid to move in the buffer region 102.

For example, after the liquid stays in the buffer region 102 for a period of time and reaches a stable state, the driving electrodes of the third driving electrode group 133 are applied with electrical signals, so that an alternating electric field is formed between the driving electrodes of the third driving electrode group 133 to transmit the alternating current signal, and thus the generated electro-hydrodynamic effect is used to drive the liquid to move in the third flow channel portion 153, that is, to promote the liquid to move in the detection region 103.

For example, after the liquid enters the detection region 103, the magnitude of the electrical signal applied to the driving electrodes of the third driving electrode group 133 may be adjusted to drive the liquid to sequentially pass through the first detection point DP1, the second detection point DP2, and the third detection point DP3, and to promote the liquid to be mixed and reacted with the detection reagents pre-embedded at the first detection point DP1, the second detection point DP2, and the third detection point DP3, so that the liquid can be fully combined with the detection reagents, and the accuracy and precision of the obtained detection result can be improved.

For example, after the liquid stays in the detection region 103 for a period of time and is fully combined with the detection reagents, the excess liquid that is not combined with the detection reagents is driven to move into the liquid storage portion 123, and then such as the optical detection instrument is used to perform optical detection on the first detection point DP1, the second detection point DP2, and the third detection point DP3 in the detection region 103, so as to obtain the index or item data of the liquid to be detected, and achieve the quantification detection of the liquid.

It should be noted that, in the embodiments of the present disclosure, in the case where the liquid needs to be moved from one region to another region, for example, when the liquid moves from the mixing region 101 to the buffer region 102, the electrical signals may be applied to the driving electrodes of the first driving electrode group 131 and the driving electrodes of the second driving electrode group 132 at the same time to drive the liquid to move from the mixing region 101 to the buffer region 102.

At least one embodiment of the present disclosure further provides a detection system, and the detection system includes the detection chip provided by any one of the embodiments of the present disclosure, such as the detection chip 10 or the detection chip 20 in the above embodiments.

Figure 5:
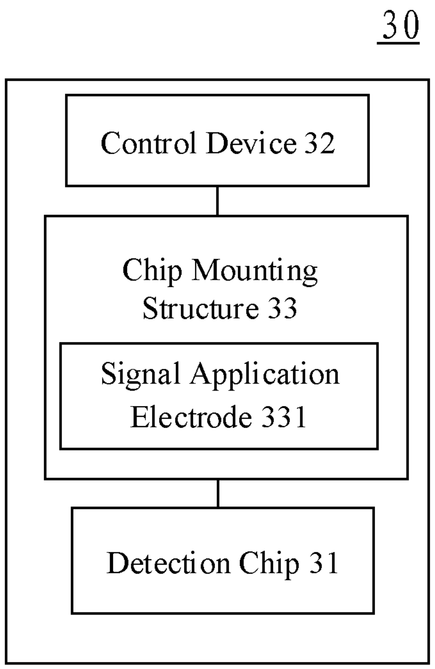
FIG. 5 is a schematic block diagram of a detection system provided by an embodiment of the present disclosure.
Figure 6:
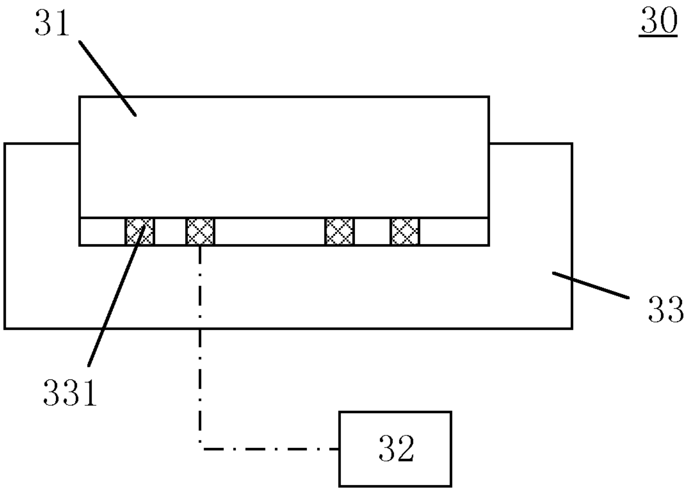
FIG. 6 is a schematic structural diagram of a detection system provided by an embodiment of the present disclosure.

FIG. 5 is a schematic block diagram of a detection system provided by an embodiment of the present disclosure, and FIG. 6 is a schematic structural diagram of a detection system provided by an embodiment of the present disclosure.

For example, as illustrated in FIG. 5 and FIG. 6, the detection system 30 includes a detection chip 31, a control device 32, and a chip mounting structure 33.

For example, the detection chip 31 may be the detection chip 10 or the detection chip 20 in the above-mentioned embodiments. The specific structure and function of the detection chip 31 may be referred to the description of the detection chip 10 or the detection chip 20 in the above-mentioned embodiments, and details are not described herein again.

For example, as illustrated in FIG. 5, the chip mounting structure 33 includes a signal application electrode 331, the chip mounting structure 33 is configured to mount the detection chip 31, and in the case where the detection chip 31 is mounted on the chip mounting structure 33, the signal application electrode 331 is electrically connected to the plurality of driving electrodes in each of the at least one driving electrode group of the detection chip 31. For example, the signal application electrode 331 may be electrically connected to the driving electrodes in each of a group consisting of the first driving electrode group 131, the second driving electrode group 132, and the third driving electrode group 133 of the detection chip 10 illustrated in FIG. 1, so that the driving electrodes of each driving electrode group can transmit the alternating current signal.

For example, the chip mounting structure 33 may also include components such as a support base, a clamping device, a clamp, etc., so that the detection chip 31 can be mounted, and the relative position of the detection chip 31 and the chip mounting structure 33 can be fixed. For example, in some examples, as illustrated in FIG. 6, the chip mounting structure 33 has a groove, and the detection chip 31 may be installed in the groove of the chip mounting structure 33. For example, when the detection chip 31 is mounted on the chip mounting structure 33, the signal application electrode 331 and the driving electrode in the detection chip 31 are electrically connected by methods of such as contacting or the like, so as to achieve the transmission of electrical signals.

For example, the control device 32 is configured to apply an electrical signal to the plurality of driving electrodes in each of the at least one driving electrode group through the signal application electrode 331, so as to drive the liquid to move and adjust a movement rate of the liquid. For example, the control device 32 applies the alternating current signal to the driving electrodes of the driving electrode group through the signal application electrode 331, so that the alternating electric field can be formed among the driving electrodes in each driving electrode group, and furthermore, the liquid in contact with the driving electrodes generates the electrohydrodynamic effect under the action of the alternating electric field to move, thereby achieving the active control of the liquid in the flow channel structure of the detection chip 31. For example, the control device 32 is in electrical connection or signal connection with the signal application electrode 331, so as to transmit the electrical signal. For example, the control device 32 may be provided on the chip mounting structure 33 or may be provided outside the chip mounting structure 33, and the embodiments of the present disclosure are not limited in this aspect.

For example, the control device 32 may be implemented as any suitable circuit or chip, or may be implemented as a combination of software, hardware, or firmware, and the embodiments of the present disclosure are not limited in this aspect.

Figure 7:
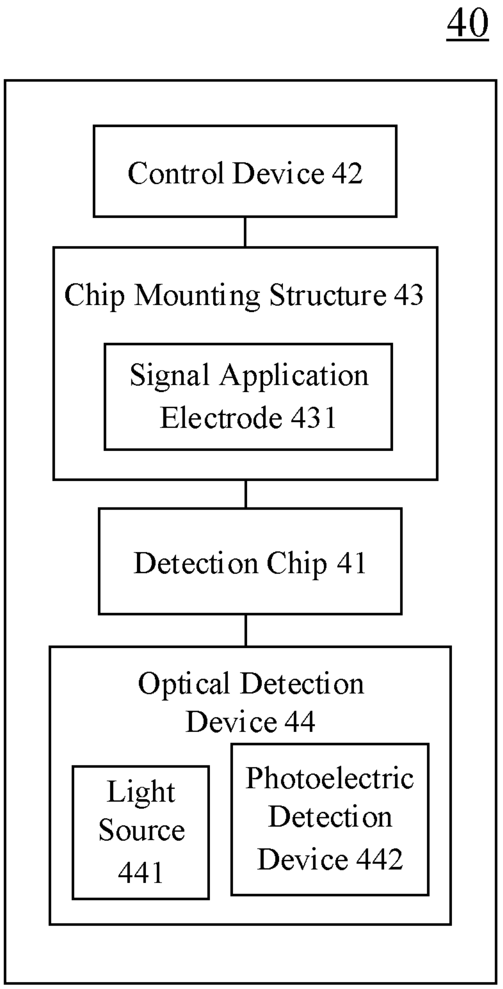
FIG. 7 is a schematic block diagram of another detection system provided by an embodiment of the present disclosure.

FIG. 7 is a schematic block diagram of another detection system provided by an embodiment of the present disclosure. It should be noted that the other structures of the detection system 40 illustrated in FIG. 7 except for an optical detection device 44 are basically the same as or similar to those of the detection system 30 illustrated in FIG. 5 and FIG. 6, and details are not described herein again.

For example, as illustrated in FIG. 7, the detection system 40 includes a detection chip 41, a control device 42, a chip mounting structure 43 (including a signal application electrode 431), and an optical detection device 44. The optical detection device 44 is configured to perform optical detection on the liquid at the at least one detection point in the detection region of the detection chip 41 mounted on the chip mounting structure 43, thereby obtaining at least one index or item data of the liquid to be detected, so as to achieve the detection function.

For example, the optical detection device 44 may include a light source 441 and a photoelectric detection device 442. The light source 441 is configured to emit light to the detection point of the detection chip 41, and the photoelectric detection device 442 is configured to receive the light emitted by the light source 441 and reflected by the detection chip 41. For example, the photoelectric detection device 442 can compare the intensity of the light reflected by the detection chip 41 with the intensity of the light emitted by the light source 441, so as to determine the presence or concentration of the object to be detected in the liquid based on, for example, the value of the absorbance obtained through detection, thereby achieving the detection of the index or item data of the liquid. For example, the photoelectric detection device 442 may be a photodiode, and the photodiode can convert the received light signal into an electrical signal, so that the intensity of the received light can be determined according to the change of the electrical parameter in the electrical signal (such as the change of the current, etc.), thereby determining the specific value of the absorbance.

The specific descriptions and technical effects of the detection system provided by the embodiments of the present disclosure may be referred to the corresponding contents of the detection chip provided by the embodiments of the present disclosure, for example, may be referred to the corresponding content of the detection chip 10 or the detection chip 20 in the above-mentioned embodiments, and details are not described herein again.

For the present disclosure, the following statements should be noted:

(1) The accompanying drawings related to the embodiment(s) of the present disclosure involve only the structure(s) in connection with the embodiment(s) of the present disclosure, and other structure(s) can be referred to common design(s).

(2) In case of no conflict, features in one embodiment or in different embodiments can be combined to obtain new embodiments.

What have been described above merely are specific implementations of the present disclosure, and the protection scope of the present disclosure is not limited thereto. The protection scope of the present disclosure should be based on the protection scope of the claims.

What is claimed is:

1. A detection chip, comprising: a base substrate, a flow channel defining layer, and at least one driving electrode group, wherein the at least one driving electrode group is on the base substrate, and the flow channel defining layer is on a side of the at least one driving electrode group away from the base substrate;

the flow channel defining layer comprises a flow channel structure, and the flow channel structure is configured to accommodate liquid; and each of the at least one driving electrode group comprises a plurality of driving electrodes, and the plurality of driving electrodes are configured to contact the liquid and drive the liquid to move within the flow channel structure, the detection chip further comprises: a mixing region, a buffer region, and a detection region, which are arranged in sequence, wherein the flow channel defining layer is at least in the mixing region, the buffer region, and the detection region, the at least one driving electrode group is configured to drive the liquid to sequentially pass through the mixing region, the buffer region, and the detection region, the flow channel structure comprises a first flow channel portion, a second flow channel portion, and a third flow channel portion which are sequentially connected; the first flow channel portion is in the mixing region and is configured to allow the liquid to be mixed with a reaction reagent in the first flow channel portion; the second flow channel portion is in the buffer region; and the third flow channel portion is in the detection region and is configured to allow to perform optical detection on the liquid at least one detection point in the third flow channel portion, wherein a cross-sectional shape of the first flow channel portion on a plane parallel to the base substrate is a rhombus, and a largest dimension of the first flow channel portion in a first direction is greater than a largest dimension of the second flow channel portion in the first direction and greater than a largest dimension of the third flow channel portion in the first direction, the first direction is perpendicular to an extending direction of the flow channel structure.

2. The detection chip according to claim 1, wherein the plurality of driving electrodes in the each of the at least one driving electrode group comprise a first electrode and a second electrode, and the first electrode and the second electrode form an interdigital electrode structure to transmit an alternating current signal.

3. The detection chip according to claim 2, wherein the first electrode comprises a plurality of first comb-shaped teeth, the second electrode comprises a plurality of second comb-shaped teeth, and first comb-shaped tooth of the plurality of first comb-shaped teeth and a second comb-shaped tooth of the plurality of second comb-shaped teeth are alternately arranged in an extending direction of the flow channel structure.

4. The detection chip according to claim 3, wherein in the extending direction of the flow channel structure, a width of a first comb-shaped tooth is different from a width of a second comb-shaped tooth, so as to allow the first electrode and the second electrode to form an asymmetric interdigital electrode structure.

5. The detection chip according to claim 4, wherein in the extending direction of the flow channel structure, the width of the first comb-shaped tooth is smaller than the width of the second comb-shaped tooth, and a distance between adjacent first comb-shaped teeth is greater than a distance between adjacent second comb-shaped teeth.

6. The detection chip according to claim 4, wherein in the extending direction of the flow channel structure, the width of the first comb-shaped tooth is 2 μm to 20 μm, and the width of the second comb-shaped tooth is 10 μm to 100 μm.

7. The detection chip according to claim 2, wherein a material of the first electrode and a material of the second electrode comprise an inert metal material.

8. The detection chip according to claim 1, wherein an orthographic projection of the flow channel structure on the base substrate is within an orthographic projection of the plurality of driving electrodes on the base substrate in the first direction.

9. The detection chip according to claim 1, wherein the at least one driving electrode group comprises a first driving electrode group, a second driving electrode group, and a third driving electrode group;

the first driving electrode group is in the mixing region, and a plurality of driving electrodes of the first driving electrode group are configured to drive the liquid to move in the mixing region;

the second driving electrode group is in the buffer region, and a plurality of driving electrodes of the second driving electrode group are configured to drive the liquid to move in the buffer region; and the third driving electrode group is in the detection region, and a plurality of driving electrodes of the third driving electrode group are configured to drive the liquid to move in the detection region.

10. The detection chip according to claim 1, further comprising a detection reagent, wherein the detection reagent is provided at the at least one detection point.

11. The detection chip according to claim 1, wherein the flow channel defining layer further comprises a sample inlet, and the sample inlet is outside the mixing region, the buffer region, and the detection region, and is connected to the first flow channel portion in the mixing region.

12. The detection chip according to claim 1, wherein the flow channel defining layer further comprises a liquid storage portion, and the liquid storage portion is outside the mixing region, the buffer region, and the detection region and is connected to the third flow channel portion in the detection region.

13. The detection chip according to claim 1, wherein the first flow channel portion, the second flow channel portion, and the third flow channel portion form a liquid movement channel, and the liquid movement channel enables the liquid to move along a movement path of a straight-line shape.

14. The detection chip according to claim 1, further comprising a cover plate, wherein the cover plate is on a side of the flow channel defining layer away from the at least one driving electrode group.

15. A detection system, comprising a detection chip, a control device, and a chip mounting structure, wherein the detection chip comprises a base substrate, a flow channel defining layer, and at least one driving electrode group, the at least one driving electrode group is on the base substrate, the flow channel defining layer is on a side of the at least one driving electrode group away from the base substrate, the flow channel defining layer comprises a flow channel structure, the flow channel structure is configured to accommodate liquid, each of the at least one driving electrode group comprises a plurality of driving electrodes, and the plurality of driving electrodes are configured to contact the liquid and drive the liquid to move within the flow channel structure, the detection chip further comprises: a mixing region, a buffer region, and a detection region, which are arranged in sequence, wherein the flow channel defining layer is at least in the mixing region, the buffer region, and the detection region, the at least one driving electrode group is configured to drive the liquid to sequentially pass through the mixing region, the buffer region, and the detection region, the flow channel structure comprises a first flow channel portion, a second flow channel portion, and a third flow channel portion which are sequentially connected; the first flow channel portion is in the mixing region and is configured to allow the liquid to be mixed with a reaction reagent in the first flow channel portion; the second flow channel portion is in the buffer region; and the third flow channel portion is in the detection region and is configured to allow to perform optical detection on the liquid at least one detection point in the third flow channel portion, wherein a cross-sectional shape of the first flow channel portion on a plane parallel to the base substrate is a rhombus, and a largest dimension of the first flow channel portion in a first direction is greater than a largest dimension of the second flow channel portion in the first direction and greater than a largest dimension of the third flow channel portion in the first direction, the first direction is perpendicular to an extending direction of the flow channel structure;

the chip mounting structure comprises a signal application electrode, the chip mounting structure is configured to mount the detection chip, and in a case where the detection chip is mounted on the chip mounting structure, the signal application electrode is electrically connected to the plurality of driving electrodes in the each of the at least one driving electrode group; and the control device is configured to apply an electrical signal to the plurality of driving electrodes in the each of the at least one driving electrode group through the signal application electrode, so as to drive the liquid to move and adjust a movement rate of the liquid.

16. The detection system according to claim 15, wherein the electrical signal comprises an alternating current signal.

17. The detection system according to claim 15, further comprising an optical detection device, wherein the optical detection device is configured to perform optical detection on the liquid at at least one detection point in a detection region of the detection chip mounted on the chip mounting structure.

* * * * *